Figure 1:
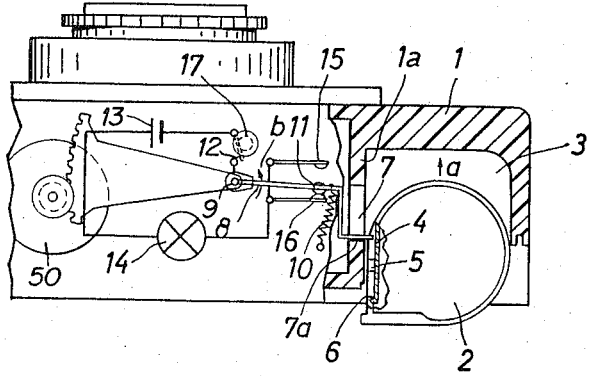

Jan. 23, 1968     D. ENGELSMANN ETAL     3,364,832
INDICATING MECHANISM FOR CARTRIDGE CAMERAS
Filed Feb. 8, 1965

INVENTOR.

DIETER ENGELSMANN
ERWIN v. WASIELEWSKI
ALFRED WINKLER United States Patent Office 3,364,832

Patented Jan. 23, 1968

3,364,832
INDICATING MECHANISM FOR CARTRIDGE CAMERAS

Dieter Engelsmann, Unterhaching, Munich, and Erwin von Wasielewski and Alfred Winkler, Munich, Germany, assignors to Agfa Aktiengesellschaft, Leverkusen, Germany Filed Feb. 8, 1965, Ser. No. 430,927
Claims priority, application Germany, Feb. 12, 1964, A 21,290
16 Claims. (Cl. 95—31)

ABSTRACT OF THE DISCLOSURE

A photographic camera wherein a lamp lights up in response to actuation of the shutter release when the film cartridge is absent from its compartment or is present in the compartment. The lamp can also indicate whether or not the cartridge contains a film which is satisfactory for used in the camera. Alternatively, a first lamp will indicate the presence or absence of the film cartridge and a second lamp will indicate the type of film in such cartridge in response to actuation of the shutter release.

The present invention relates to cameras. More particularly, the invention relates to photographic and cinematographic cameras of the type wherein a cartridge, magazine or another type of film-containing or film-receiving container is insertable into and removable from the camera housing.

It is an important object of the present invention to provide a camera which is constructed and assembled in such a way that the user may determine the presence and/or absence of a cartridge or magazine without being compelled to open the housing.

Another object of our invention is to provide a camera of the just outlined characteristics which can produce a readily detectable signal at the will of the user in order to indicate the presence and/or absence of a cartridge or magazine without being compelled to open the housing.

Another object of our invention is to provide a camera of the just outlined characteristics which can produce a readily detectable signal at the will of the user in order to indicate the present and/or absence of a cartridge or magazine.

A further object of the invention is to provide a camera for use with film cartridges or film magazines wherein the absence and/or presence of a cartridge or magazine can be indicated by an arrangement which can simultaneously perform one or more additional functions.

Another object of the invention is to provide a photographic camera or a movie camera with a very simple, space-saving and inexpensive indicating or signal generating arrangement capable of informing the user of the presence and/or absence of a cartridge or magazine and constructed in such a way that it consumes energy only at such times when the user seeks information concerning the presence or absence of the cartridge or magazine in the camera housing.

A concomitant object of the instant invention is to provide a signal generating or indicating arrangement of the just outlined characteristics which may be combined with the built-in exposure meter of a camera.

Still another object of the invention is to provide a signal generating system of the above outlined characteristics which can be installed in presently utilized types of cameras, which can be adapted for use in connection with many known types of cartridges or magazines including so-called coreless cartridges wherein a film can be coiled without being connected to a rotary spool, and which can be manipulated not only by skilled photographers but also by beginners.

Briefly stated, one feature of our invention resides in the provision of a photographic camera or motion picture camera which comprises a housing defining a chamber arranged to receive a removable film cartridge or film magazine, and an indicating arrangement for supplying information regarding the presence and/or absence of a cartridge or magazine in the chamber. The indicating arrangement comprises sensing means extending into the chamber and movable by an inserted cartridge or magazine from a position of rest to a second position, and signal generating means operative to produce a readily detectable signal on movement of the sensing means to its second position.

It is not necessary that the signal generating means produce a visible or otherwise detectable signal as soon as the cartridge or magazine is properly inserted into or removed from the chamber, i.e., in direct response to insertion or withdrawal of a container for film. For example, the signal generating means may comprise an electric lamp whose circuit is completed only when the user decides to close a normally open main switch connected in series with the lamp and with a single-pole or multi-way control switch which latter includes the aforementioned sensing means and closes only when the sensing means moves to its second position.

The readily detectable signal may consist in that the lamp lights up when its circuit is completed subsequent to movement of the sensing means to its second position or in that the lamp does not light up, i.e., the user can be informed that the cartridge or magazine is received in its chamber if the signal generating means indicates such presence of the cartridge or magazine by not lighting up.

The novel features which are considered as characteristic of the invention are set forth in particular in the appended claims. The improved camera itself, however, both as to its construction and the mode of operating the same, together with additional features and advantages thereof, will be best understood upon perusal of the following detailed description of certain specific embodiments with reference to the accompanying drawings, in which:

FIG. 1 is a fragmentary diagrammatic top plan view of a photographic camera which is constructed in accordance with a first embodiment of our invention and comprises a single signal generating element, a portion of the camera housing being broken away to reveal the film cartridge and its chamber;

FIG. 2 is a similar fragmentary diagrammatic top plan view of a simplified camera with a single signal generating element; and FIG. 3 is a fragmentary diagrammatic top plan view of a third camera with two signal generating elements.

Referring to FIG. 1, there is shown a 35-mm. camera which comprises a housing 1 defining a chamber 3 adapted to accommodate a film cartridge 2. This cartridge is of the so-called spoolless type wherein the film may be coiled without being connected to a rotary spool. The mantle of the cartridge 2 comprises a flat portion 4 which carries an actuating member or trip 5. In a manner disclosed, for example, in Patent No. 3,266,397 granted to Rudolf Kremp et al. and assigned to the same assignee, the trip 5 also serves to adjust the built-in exposure meter 50 of the camera in dependency on the sensitivity of the film which is coiled up in the cartridge 2. Such adjustment in dependency on the sensitivity of the film will be contingent upon the distance between the trip 5 and a reference shoulder 6 at one end of the flat portion 4, i.e., the position of the trip 5 with reference to the remainder of the mantle is indicative of the type of film in the cartridge 2. In the present instance, the distance between the shoulder 6 and the trip 5 is indicative of the film sensitivity.

A partition 1a of the housing 1 is formed with an aperture 7 for the free end portion of a sensing element 8 which is rockable about the axis of a fixed pivot 9. The sensing element 8 is biased by a spring 10 so that it normally assumes a position of rest in which it abuts against a stop face 7a at the rear end of the aperture 7. The free end portion of the sensing element 8 extends into the path of the trip 5 so that this element will normally be rocked about the axis of the pivot 9 when the cartridge 2 is properly inserted into the chamber 3. When the cartridge 2 is removed, the free end portion of the sensing element 8 automatically returns into abutment with the stop face 7a.

The sensing element 8 forms part of a moving contact 11 which is connected to one pole of a source 13 of electrical energy when the user of the camera closes a normally open main switch 12. This main switch will close in response to depression of an operating member here shown as a conical pushbutton 17 adapted to be connected to a suitable manually operated trigger, not shown. The other pole of the source 13 is connected in series with a signal generating electric lamp 14 and with two fixed contacts 15, 16 located at the opposite sides of the moving contact 11. It will be seen that the contacts 11, 15, 16 together constitute a two-way control switch wherein the contact 11 may be held between the fixed contacts 15, 16 or it may move into engagement with the contact 15 or 16. The source 13 may also serve to supply electric current to another unit of the camera mechanism, for example, to the exposure meter 50 or to an electric film transporting device.

When the cartridge 2 is removed, the parts of the just described electric circuit take the positions shown in FIG. 1. If the user inserts the cartridge 2 in the direction indicated by the arrow a so that the cartridge practically fills the chamber 3, the trip 5 engages the tip of the sensing element 8 and causes it to move from its rest position and away from the stop face 7a. Thus, the sensing element is rocked in the direction indicated by an arrow b. If the distance between the trip 5 and reference shoulder 6 is indicative of a film sensitivity which can be properly registered by the built-in exposure meter 50 of the camera, the contact 11 will come to a halt somewhere between the fixed contacts 15, 16 to indicate that the type of film stored in the cartridge 2 can be used in the camera. Consequently, when the user actuates the trigger which depresses the pushbutton 17 to close the main switch 12, the circuit of the signal lamp 14 remains open and the user knows that the camera is ready to take a picture. In other words, the signal consists in that the lamp 14 does not light up.

If the chamber 3 is empty, the sensing element 8 abuts against the stop face 7a and the contact 11 engages the fixed contact 16. This means that the lamp 14 lights up as soon as the main switch 12 is closed by the pushbutton 17. The user then knows that the camera is not ready to take a picture.

If the cartridge 2 contains a film whose sensitivity exceeds the sensitivity that can be properly registered by the built-in exposure meter 50 of the camera, the distance between the trip 5 and shoulder 6 is such that the trip moves the contact 11 against the fixed contact 15 to again complete the circuit of the lamp 14 as soon as the pushbutton 17 closes the main switch 12. Alternatively, if the sensitivity of the film is less than the minimum sensitivity which can be registered by the exposure meter 50, the trip 5 is so close to the shoulder 6 that the sensing element 8 is not rocked at all and the contact 11 remains in engagement with the fixed contact 16. Therefore, the lamp 14 will light up to again produce a readily detectable signal as soon as the main switch 12 is closed.

A very important advantage of the indicating arrangement shown in FIG. 1 is that it need not comprise any mechanical motion transmitting means between the signal generating element 14 and sensing element 8. Consequently, the element (lamp) 14 may be mounted at any desired point of the camera, for example, behind a window provided in the top wall of the camera housing 1 or in the viewfinder.

It is clear that the lamp 14 may be replaced by another suitable signal generating element. Thus, it is possible to utilize a movable pointer provided with a flag and operable by a relay or by an electromagnet of the rotary-coil, telescoping-coil or moving-iron type (see, for example, British Patent No. 943,929 and Austrian Patent No. 230,726). The relay or the electromagnet is energized whenever the main switch 12 is closed while the moving contact 11 engages the fixed contact 15 or 16. The flag will be concealed when the cartridge 2 is properly inserted into the chamber 3 and contains a film of requisite sensitivity. If the chamber 3 is empty or if the sensitivity of the film is not satisfactory, the flag will be visible as soon as the main switch 12 is closed by the pushbutton 17.

Figure 2:
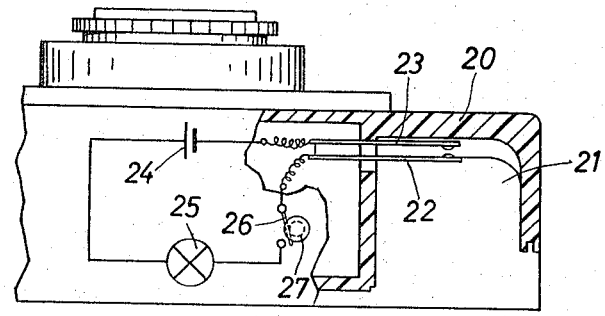

FIG. 2 illustrates a modified camera having a housing 20 which defines a chamber 21. The film cartridge (not shown) has been removed from the chamber 21; therefore the moving contact 22 of a single-pole single-break control switch is out of engagement with a fixed contact 23. The moving contact 22 is analogous to the moving contact 11 of the arrangement shown in FIG. 1, i.e., it also acts as a sensing element. This moving contact 22 is elastically deformable and it normally takes a position of rest spaced from the fixed contact 23, the latter being mounted on the front wall of the chamber 21 so as to have a rigid backing when it is engaged by the tip of the contact 22. These contacts are connected in an electric circuit which further includes a source 24 of electrical energy, a signal generating lamp 25, a normally open main switch 26 and a conical operating member in the form of a pushbutton 27 which can be depressed by a trigger (not shown) to close the main switch 26. The circuit of the lamp 25 is completed only if the main switch 26 is closed simultaneously with closing of the control switch including the contacts 22, 23.

The camera of FIG. 2 is constructed to produce a visible signal when the cartridge is properly inserted into the chamber 21 but will not produce a signal when the sensitivity of the film does not correspond to a desired sensitivity. The indicating arrangement shown in FIG. 2 is very simple and less prone to malfunction than the structure of FIG. 1; however, it is not as versatile as the previously described one. When the chamber 21 is empty, the contact 22 is distant from the contact 23 so that the lamp 25 does not light up even if the user depresses the pushbutton 27 to close the main switch 26. If the chamber 21 accommodates a cartridge, the mantle of the cartridge deforms the contact 22 and moves it into engagement with the contact 23 so that the lamp 25 lights up as soon as the main switch 26 is closed by the pushbutton 27. This informs the user that the chamber 21 is loaded.

Figure 3:
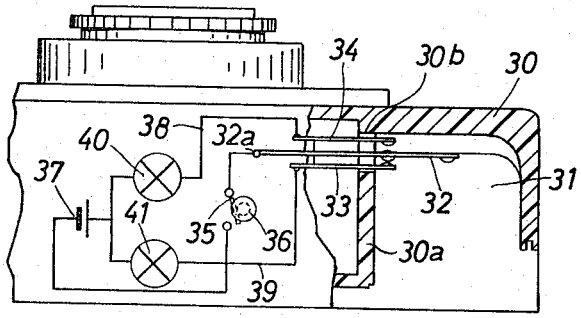

Referring finally to FIG. 3, there is shown a camera comprising a housing 30 having a chamber 31 which may receive a film cartridge of the coreless type or any conventional spool-type cartridge. The partition 30a of the housing 30 is formed with an aperture 30b for an elastically deformable sensing element 32 which simultaneously constitutes the moving contact of a two-way switch having two fixed contacts 33, 34 disposed at the opposite sides of the contact 32. As shown in FIG. 3, the tips of the fixed contacts 33, 34 may also extend through the aperture 30b and into the chamber 31. In the illustrated embodiment, the left-hand end portion of the moving contact 32 is fixed to a pin 32a and this moving contact automatically engages the fixed contact 33 when the cartridge is removed from the chamber 31. However, it is equally possible to mount the contact 32 for pivotal movement about the pin 32a and to provide a spring 10 (see FIG. 1) which normally holds the contact 32 in the position of rest, namely, in engagement with the contact 33.

The circuit of the camera shown in FIG. 3 further comprises two different signal generating lamps 40, 41, a source 37 of electrical energy, a normally open main switch 35, and a conical pushbutton 36 reciprocable by a suitable trigger and serving to close the main switch 35 at the will of the user. A first conductor 38 connects the lamp 40 with the fixed contact 34 and a second conductor 39 provides an electrical connection between the lamp 41 and fixed contact 33. As clearly shown in FIG. 3, one pole of the source 37 is connected in series with the main switch 35 and with the control switch including the contacts 32–34. The other pole of the source 37 is connected with conductors 38, 39 and fixed contacts 34, 33. Thus, the lamps 40, 41 are connected in parallel and may light up in response to closing of the main switch 35 and in response to simultaneous engagement between the moving contact 32 and fixed contacts 34 or 33.

In accordance with a preferred construction of the camera shown in FIG. 3, the lamp 40 will produce a green signal and the lamp 41 produces a red signal.

When the cartridge is removed from the chamber 31, the contact 32 engages the contact 33 so that the lamp 41 produces a red signal as soon as the operator causes the pushbutton 36 to close the main switch 35. The circuit of the lamp 41 is then completed through the source 37, conductor 39, contacts 33, 32 and main switch 35. The red signal indicates to the user that the chamber 31 is empty.

If the chamber 31 accommodates a properly inserted cartridge, the mantle of such cartridge will flex the contact 32 away from the contact 33 and into engagement with the fixed contact 34. Therefore, the lamp 40 lights up and produces a green signal as soon as the user closes the main switch 35 through the intermediary of the pushbutton 36. The circuit of the lamp 40 is then completed through the source 37, conductor 38, contacts 34, 32 and main switch 35. The green light indicates to the user that the camera is ready to take a picture.

It is obvious that the embodiments shown in FIGS. 1 to 3 are susceptible of many additional modifications without departing from the scope of our invention. For example, and as mentioned in connection with FIG. 1, the signal lamps 25, 40, 41 may be replaced by flags which are movable by relays and/or electromagnets and which, either by their positions or by their coloring, indicate to the user whether or not the film cartridge is actually received in its chamber.

Furthermore, the structure shown in FIG. 3 may be modified by incorporating therein certain features of the structure shown in FIG. 1. Thus, the moving contact 32 may be flexed by a trip corresponding to the trip 5 of the cartridge 2 to produce a warning signal (red light) whenever the sensitivity of the film which is received in the cartridge does not correspond to a sensitivity which can be registered by the built-in exposure meter of the camera.

In the appended claims, the expression cartridge or film cartridge is intended to embrace cartridges of photographic cameras as well as magazines of the type used in movie cameras.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a combination comprising a housing defining a chamber arranged to receive a removable film cartridge; and indicating means for indicating at least the presence or absence of a satisfactory cartridge in said chamber, including sensing means extending into said chamber and movable by a satisfactory cartridge from a position of rest to at least one second position, signal generating means for indicating the positions of said sensing means, and camera operating means for actuating said signal generating means in at least one position of said sensing means.

2. A combination as defined in claim 1, wherein said indicating means comprises an electric circuit and said signal generating means comprises at least one electric signal generating device in said circuit, said camera operating means comprising means for completing a portion of said circuit and said sensing means comprising means for completing the remainder of said circuit in said position of rest.

3. A combination as defined in claim 1, wherein said indicating means comprises an electric circuit and said signal generating means comprises at least one electric signal generating device in said circuit, said camera operating means comprising means for completing a portion of said circuit and said sensing means comprising means for completing the remainder of said circuit in response to movement from said position of rest.

4. A combination as defined in claim 1, wherein said indicating means comprises an electric circuit and said signal generating means comprises a plurality of electric signal generating devices in said circuit, said camera operating means comprising means for completing a portion of said circuit and said sensing means comprising means for completing the remainder of said circuit across one of said signal generating devices in said position of rest and for completing the remainder of said circuit across another signal generating device in response to movement away from said position of rest.

5. A combination as defined in claim 1, wherein said signal generating means comprises at least one electric lamp and said indicating means comprises a normally open electric circuit including said lamp, said camera operating means comprising means for completing or opening a first portion of said circuit and said sensing means comprising means for completing or opening a second portion of said circuit so that said lamp can be lighted only when both said circuit portions are completed.

6. A combination as defined in claim 1, further comprising adjustable exposure meter means and means for adjusting said exposure meter means in response to movement of said sensing means from said position of rest.

7. A combination as defined in claim 1, wherein said chamber is arranged to receive cartridges of the type having portions indicating the speed of film therein and engageable with said sensing means to move the latter from said position of rest when the speed of film therein is satisfactory.

8. A combination as defined in claim 7, wherein said sensing means is also movable from said position of rest by a portion of a cartridge indicating a film speed which is above or below a range of satisfactory speeds.

9. A combination as defined in claim 1, wherein said indicating means comprises an electric circuit and said signal generating means comprising at least one electric signal generating device in said circuit, said camera operating means comprising a normally open first switch in said circuit and said circuit further comprising a second switch whose condition depends on the position of said sensing means.

10. A combination as defined in claim 9, wherein said second switch is a single-break switch.

11. A combination as defined in claim 9, wherein said second switch is a two-way switch and is closed when the sensing means assumes said position of rest.

12. In a camera, in combination, a housing defining a chamber arranged to receive a removable film cartridge;

and means for indicating the presence and absence of a cartridge in said chamber, comprising an electric circuit including a source of electrical energy, a pair of signal generating devices connected in parallel with each other and in series with one pole of said source, and a two-way control switch comprising a pair of fixed contacts each connected in series with one of said signal generating devices and a movable contact connected in series with the other pole of said source, said moving contact normally engaging one of said fixed contacts to thereby complete the corresponding part of the circuit for one of said signal generating devices and having a portion extending into said chamber and into the path of a cartridge so that, when a cartridge is inserted into said chamber the moving contact is compelled to engage the other fixed contact to thereby complete the corresponding part of the circuit for the other signal generating device.

13. A structure as set forth in claim 12, wherein said circuit further comprises a normally open main switch provided between said moving contact and the other pole of said source and operating means for closing said main switch at the will of the user so that said signal generating devices can produce signals only when said moving contact engages the corresponding fixed contact simultaneously with closing of said main switch.

14. A structure as set forth in claim 12, wherein said signal generating devices are arranged to produce different signals.

15. A structure as set forth in claim 12, wherein said signal generating devices are electric lamps arranged to produce differently colored signals in response to completion of their circuits.

16. In a camera, in combination, a housing defining a chamber arranged to accommodate a film cartridge; and means for indicating the presence or absence of a cartridge in said chamber, comprising sensing means having a portion extending into said chamber and movable by a cartridge from a position of rest to a second position, and signal generating means operative to produce a first signal while said sensing means takes the position of rest and a different second signal on movement of said sensing means to said second position.

References Cited
UNITED STATES PATENTS

| | | | |
|---|---|---|---|
| 2,705,316 | 3/1955 | Harris | 340—280 |
| 3,096,699 | 7/1963 | Harvey et al. | 95—31 |
| 3,112,683 | 12/1963 | Powers et al. | 95—31 |
| 3,176,599 | 4/1965 | Anwyl | 95—10 |
| 3,212,421 | 10/1965 | Hackenberg | 95—31 |
| 3,260,183 | 7/1966 | Winkler et al. | 93—31 |

FOREIGN PATENTS

| | | |
|---|---|---|
| 1,342,730 | 9/1963 | France. |

NORTON ANSHER, *Primary Examiner.*

J. F. PETERS, *Assistant Examiner.*